3,281,332
METHOD FOR THE MANUFACTURE OF RENNIN
William O. Munns, Weston, Ontario, and Eugene Dutkewych, Toronto, Ontario, Canada, assignors to Canada Packers Limited, Ontario, Canada
No Drawing. Filed Jan. 23, 1964, Ser. No. 339,604
15 Claims. (Cl. 195—66)

This invention relates to an improved method of isolating rennin from animal stomach linings. More particularly, the present invention relates to a novel method of producing rennin from animal stomach linings in which the stomach linings are comminuted, activated with acid, and dried and defatted to produce a powdered product.

Rennin is the main milk-clotting enzyme secreted by the fourth stomach or rennet of the suckling calf. Its inactive precursor is prorennin. In the commercial processes most widely employed at present, rennin is produced as a liquid product by extracting the prorennin or rennin activity from calves' rennets with an aqueous salt solution, activating the extract with acid, and adjusting the pH and salt content of the activated extract. The rennets can be either fresh, salted or salted and air dried. The disadvantages of these preparative methods are fourfold. Since extraction requires a great deal of time, growth of micro-organisms in the extract is always a concern. Secondly, when starting with poor quality rennets, it is often difficult to obtain a rennin solution of suitable commercial strength. Also, the third and fourth extracts are of such weak rennin activity that they have to be reprocessed. Lastly, the product is a liquid and is perishable and relatively expensive to transport. In one of these typical processes calves' rennets are received from the packing house packed in salt. The rennets have to be first washed with saturated sodium chloride solution to remove the solid salt. They are then stretched and excess fat is stripped from them. They are ground and mixed with an equal quantity of fresh hardwood sawdust. This mixture is then dried at 80° to 110° F. and the dried mixture is loaded into extracting tanks. The prorennin activity in this dried mass is extracted with 10 percent refrigerated salt brine at a pH of 5.95 to 6.05. This extraction is continued for two or more days. When the activity in the solution fails to increase, the extract is drawn off to finishing tanks. Further extractions are made of the mass till the level of rennin activity becomes too low to process economically. The prorennin is activated by adjusting the pH to 4.6 with the addition of hydrochloric acid. This process requires about 14 to 36 hours. When no further increase in rennin activity is noted, the pH of the solution is adjusted to 5.7. This rennin solution is then twice filtered to obtain the desired clarity. Between these filtrations, the rennin solution is blended to a standard strength. Salt, preservatives and coloring are then added and the final extract is packaged in one or five gallon polyethylene containers for retailing.

It is an object of the present invention to provide a novel method of producing rennin from animal stomach lining which avoids the lengthy extraction procedures and other aforementioned difficulties.

Another object of this invention is to provide a method for the recovery of rennin from acid-digested animal stomach linings in a dried, powdered easily marketable form having improved shelf-like, requiring less storage space and being easily transported.

A further object of the invention is the provision of a readily dispersible powdered rennin product.

A still further object of the present invention is to provide a simple and practical method for producing dried rennin powder in good yield from animal stomach linings.

Additional objects and advantages of the present invention will be readily apparent as the same becomes better understood from the following detailed description and claims.

The method of the invention in its overall aspects comprises grinding the rennets and treating them with acid to activate the prorennin to rennin. The pH of the mixture is then adjusted to the pH of optimum stability of the enzyme, from about 5 to 6, preferably 5.7. The mixture is then dried under conditions which will not inactivate the rennin. The drying may be carried out either in a vacuum oven or similar apparatus or by azeotropic distillation with a fat solvent, such as xylene. The latter is preferred because it permits the simultaneous removal of water and defatting of the linings thereby contributing to the ease by which rennin may be subsequently recovered. In the former drying procedure the dried product is subsequently defatted by treatment with a fat solvent. In the drying operation wherein xylene is used as the fat solvent, traces of residual solvent may be eliminated by treatment with alcohol. After drying, the product is treated with an edible emulsifying agent to improve the wettability of the dry powder in water. The dried powder containing the emulsifier is then blended with salt to give a product of uniform rennin content and to further improve its wettability. It is then packaged in suitable packaging materials. The yield of rennin powder (25,000 I.U. of rennin activity per gm.) ranges from 15 to 55% based on the weight of the rennets processed. The variation in yield is due to the differing quality of commercially available rennets.

Preparation of rennin in powder form by this method reduces processing time from one to two weeks to one to two days with obvious great reduction in processing costs. The preparation of solutions of low rennin strength as occur in the second, third and fourth extractions in the preparation of liquid rennin, is avoided. Since there is no step in the process where bacterial spoilage can occur, it is not essential to utilize refrigerated conditions which are essential in liquid rennin production. The product being in dry form is stable at room temperature, and can be transported inexpensively whereas liquid rennin must be refrigerated and is fairly expensive to transport.

In the initial stage of the process fresh rennets or frozen rennets are ground and treated with acid, usually HCl. Unsalted rennets are preferred since the presence of salt in the acid system has been found to lower the yield of rennin obtainable. The purpose of the acid treatment is to activate prorennin, the inactive precursor of rennin. The concentration of the HCl is not critical and excellent results are obtained with 12 N HCl, which is the usual commercial concentrated acid. The amount of HCl may be varied over a wide range, from 4 to 20 mls. of 12 N HCl per lb. of linings providing good results. Excellent results are obtained using 10 mls. of HCl per lb. of linings. If desired, the HCl may be added while the lining is being ground and the linings may be digested with the added acid at an elevated temperature below that at which the enzyme would be destroyed. The temperature of digestion and activation may be varied from 30° to 50° C., 38° to 43° C. being optimum and preferred. In Table I below are shown results of studies conducted to determine the optimum concentration of HCl for activation. Additional water was added to achieve a ratio of aqueous HCl to linings of 2/1 in these and subsequent experiments.

TABLE I.—THE EFFECT OF HYDROCHLORIC ACID CONCENTRATION ON THE ACTIVATION OF RENNIN FROM CALVES' RENNETS

| Mls. of conc. HCl acid per lb. of linings | Time to reach the minimum clotting time (hrs.) (maximum activity) | Strength of rennin solution in percent (relative to standard rennin powder) | Activation temperature (° C.) |
|---|---|---|---|
| 4  | 8     | 62 | 40 |
| 6  | 5     | 68 | 38 |
| 8  | 3½    | 81 | 39 |
| 10 | 1¼    | 87 | 39 |
| 12 | 1     | 82 | 40 |
| 17 | <1    | 75 | 39 |
| 19 | <1    | 72 | 40 |

It is evident from the above table that the optimum condition for activating the rennin occurs at about 10 ml. of concentrated hydrochloric acid per lb. of rennets at a temperature of 38–40° C.

After the rennin of the linings is activated, the pH of the mixture is adjusted to about 5.7, the pH of maximum stability of the enzyme, preparatory to drying. It has been previously taught in a patent to Keil, No. 2,339,931 that it is necessary to peptize acid digested rennin, preferably by the addition of alkali metal phosphates to the acid digests, the peptizing supposedly leading to greater extraction of the rennin. Contrary to Keil's teaching, we have not found it necessary to peptize the digestion mass. It is desirable, however, to adjust the pH to about 5.7 in order to obtain maximum stability of the enzyme. We have found that some loss of rennin activity occurs during this adjustment, and that other bases provide as good, and in some instances, better results than phosphates. This is illustrated below in Table II.

TABLE II.—THE EFFECT ON RENNIN YIELD DUE TO THE ALKALI USED FOR pH ADJUSTMENT OF THE DIGEST

|  | Alkali Used, percent | | |
|---|---|---|---|
|  | $Na_3PO_4$ | $NaHCO_3$ | $KHCO_3$ |
| Loss of Rennin Activity on pH Adjustment to 5.7 | 9.2 | 9.5 | |

It is obvious that sodium bicarbonate is equivalent to trisodiumphosphate for the pH adjustment and that potassium bicarbonate is far superior to either of the other two agents, resulting in less than one quarter of the percentage loss of rennin activity experienced with the other two bases. Improved results are obtained if the alkali salt for pH adjustment is added as a solution rather than as a solid.

The mixture is now ready for drying either in a vacuum apparatus or by azeotropic distillation. The pH adjusted digestion mass may be loaded into trays and placed in a vacuum shelf dryer, the dried under vacuum at a temperature below that at which the enzyme is destroyed, e.g., 70° C. or below. The vacuum oven desiccation is followed by defatting in a fat solvent, such as hexane, following which the product is worked up by salt addition and is packaged.

Because of the simultaneous defatting and the shorter time required, drying by azeotropic distillation is preferred. In carrying out this procedure, the pH adjusted digestion mass is combined with a suitable organic solvent which forms an azeotrope with the water associated with the acid digested stomach linings. Suitable organic solvents for this purpose are the halogenated derivatives of low boiling aliphatic hydrocarbons such as ethylene dichloride which previously has been suggested as a preferred solvent for azeotropic dehydration of biological substances. However, a further aspect of the present invention resides in the discovery that the azeotropic drying and defatting steps may be carried out to a greater advantage with a higher boiling and less toxic fat solvent. The preferred fat solvent is xylene which has a boiling point of 139° C. at 760 mm. of Hg, and forms an azeotrope containing 35.8% by weight of water which boils at 92° C. at 760 mm. Hg. Ethylene dichloride, on the other hand, boils at 84° C. and forms an azeotrope containing only 19.95% by weight of water.

Unexpectedly, it has been found possible to use the high boiling xylene without adversely affecting the rennin stability. The use of xylene provides a number of advantages with respect to chlorinated hydrocarbons. The fumes of xylene are less toxic. The azeotrope with xylene contains a much higher precentage of water and, as a result, a much shorter drying time is required. The cost of xylene is relatively low. Thus, the process can be performed with less hazard and much more rapidly and economically with xylene than with the other proposed solvents.

The distillation procedure is carried out in a known manner. Thus, the activated linings may be placed in a still provided with a jacket through which hot water is circulated for heating purposes. The distillation is conducted under a vacuum, e.g., at a pressure in the range of about 10 to 250 mm. Hg so that the maximum temperature is below the boiling point of the solvent at atmospheric pressure.

Distillation may be commenced at a temperature below about 60° C. and maintained at this temperature until there is a sharp rise in the boiling point of the contents of the still. The distillation may then be stopped shortly after this rise in temperature. Preferably, the entire operation is within the temperature range of 30° to 70° C. The results of a number of experiments utilizing xylene as the solvent are contained in Table III below:

TABLE III.—THE AZEOTROPIC DESICCATION AND DEFATTING OF ACTIVATED CALF RENNETS WITH XYLENE

| Expt. No. | Bath temp. (° C.) | Vacuum (in. of Hg) | Solvent temp., (° C.) | Time (hrs.) | Yield of dried rennin | | |
|---|---|---|---|---|---|---|---|
|  |  |  |  |  | Rennin activity (units/gm.) | Percent weight of fresh rennets | Yield expressed as percent of 1:25,000 rennin powder based on the fresh weight of rennets |
| RAW MATERIAL—GROUP I RENNETS—0.3 LBS. PER RENNET OR LESS | | | | | | | |
| 1 | 80–86 | 28 | 38–58 | 3½ | 62,700 | 18.1 | 45.3 |
| 2 | 80–86 | 28 | 32–56 | 4½ | 61,200 | 18.0 | 44.1 |
| 3 | 80–86 | 28 | 32–54 | 3½ | 61,200 | 17.3 | 42.4 |
| Average |  |  |  |  | 61,700 | 17.8 | 43.9 |
| RAW MATERIAL—GROUP II RENNETS—0.31 TO 0.40 LBS. PER RENNET | | | | | | | |
| 4 | 80–86 | 28 | 32–54 | 3½ | 53,900 | 17.3 | 37.3 |
| 5 | 80–86 | 28 | 36–58 | 4 | 62,900 | 21.9 | 55.1 |
| 6 | 80–86 | 28 | 32–54 | 6 | 54,100 | 17.9 | 38.7 |
| Average |  |  |  |  | 57,000 | 19.0 | 43.7 |

TABLE III.—THE AZEOTROPIC DESICCATION AND DEFATTING OF ACTIVATED CALF RENNETS WITH XYLENE—Continued

| Expt. No. | Bath temp. (° C.) | Vacuum (in. of Hg) | Solvent temp., (° C.) | Time (hrs.) | Yield of dried rennin | | |
|---|---|---|---|---|---|---|---|
| | | | | | Rennin activity (units/gm.) | Percent weight of fresh rennets | Yield expressed as percent of 1:25,000 rennin powder based on the fresh weight of rennets |
| RAW MATERIAL—GROUP III RENNETS—0.41 TO 0.50 LBS. PER RENNET | | | | | | | |
| 7 | 80–86 | 28 | 33–56 | 6 | 36,700 | 19.2 | 28.2 |
| 8 | 80–86 | 28 | 32–58 | 4½ | 39,700 | 17.5 | 27.8 |
| 9 | 80–86 | 28 | 32–54 | 8 | 53,700 | 21.9 | 47.1 |
| 10 | 80–86 | 28 | 32–54 | 7½ | 55,750 | 20.4 | 45.5 |
| Average | | | | | 46,500 | 19.8 | 37.2 |
| RAW MATERIAL—GROUP IV RENNETS—0.50 LBS. PER RENNET OR MORE | | | | | | | |
| 11 | 80–86 | 28 | 36–58 | 6 | 22,000 | 16.6 | 14.6 |
| 12 | 80–86 | 28 | 32–54 | 7½ | 48,800 | 18.8 | 36.7 |
| 13 | 80–86 | 25–28 | 32–67 | 7½ | 50,200 | 18.3 | 36.7 |
| 14 | 80–86 | 28 | 32–54 | 4 | 26,500 | 18.9 | 20.0 |
| Average | | | | | 36,900 | 18.2 | 27.0 |

The rennets were segregated on a weight basis into arbitrary groups. The individual weight of the rennet gives a measure of the rennin content. Heavier rennets come from older calves and hence, contain less rennin and this accounts for the greater variation in reported yields. In Table III the lower solvent temperature is that at which distillation was begun and the higher temperature is that at which distillation was terminated. After completion of the azeotropic distillation, the dried and defatted rennin is recovered by filtration. The product at this point retains an odor of xylene which is difficult to remove. Attempts to remove the traces of xylene with hexane, ether, acetic acid in hexane, ethyl acetate and ethylene dichloride solvents were all unsuccessful. However, we have found that by treatment of the product with ethanol essentially all the xylene is removed.

In Table IV below, it is shown that either the vacuum or azeotropic distillation method of desiccation may be utilized with satisfactory yields of rennin activity.

TABLE IV.—THE EFFECT ON POWDER RENNIN YIELD OF THE METHOD OF DESICCATION

| Items | Simultaneous desiccation and defatting in xylene | Vacuum desiccation followed by solvent defatting |
|---|---|---|
| Test One: | | |
| Rennin activity (units/gm.) | 41,700 | 40,100 |
| Yield expressed as percent of 1:25,000 rennin powder based on the fresh weight of rennets | 29.0 | 25.8 |
| Test Two: | | |
| Rennin activity (units/gm.) | 44,500 | 34,600 |
| Yield expressed as percent of 1:25,000 rennin powder based on the fresh weight of rennets | 29.7 | 22.6 |

As stated above, addition of a commercial, edible, emulsifying agent to the dry rennin powder improves the dispersibility of the product. Suitable emulsifying agents are any of the commercially available liquid food emulsifiers, including the surface active esters and ethers of polyhydric alcohols and polyoxyalkylene derivatives of hexitol anhydride partial long chain fatty acid esters such as Tween 60, Tween 80, Atmos 300, Atmul 124 and Span 60 of the Atlas Powder Company. They can be added either individually or as mixtures. A solution of one part Atmos 300 and two parts ethanol, when sprayed onto agitated dried powder rennin has been found to provide the best dispersibility of the powder at 1% concentration in cold water.

Atmos 300 is a clear, light, amber liquid at 25° C. with a viscosity of 150 cp. (25° C.), a specific gravity of approximately 0.96 (25° C.) and has a bland odor and taste. Other specifications of this product as manufactured are:

| | Test method |
|---|---|
| Total monoglycerides (alpha and beta forms) 54–59% | J. B. Martin |
| Free fatty acid (as oleic) not over 0.5% | A.O.C.S. Ca–5a–40. |
| Moisture, not over 0.5% | A.O.C.S. Ca–2e–55. |
| Color, not over 6 | Hess-Ives. |
| Clear point, not over 24° C. | Atlas. |

The rennin powder, as recovered, is desirably standardized by mixing the same with sufficient salt so as to contain 25,000 units of rennin activity per gm. of powder. Surprisingly, it has been found that the wettability of the final product can be further greatly increased by increasing the salt content to about 50 to 70%, total salt content. This is easily accomplished by mixing the standardized product with approximately an equal weight of salt, thereby obtaining a final product of 12,500 units rennin activity per gram.

The powdered rennin product is preferably packaged in a suitable packaging material that will both protect enzyme activity and prevent further contamination by microorganisms. Plastic films and laminates which are substantially impervious to both air and moisture are, in general, satisfactory. Best results are obtained with laminates that also include a metallic foil, e.g., aluminum foil. The following laminates have been tested:

(1) Saran laminated cellophane (300 gauge), 0.0005" polyethylene film, 0.001" aluminum foil, and 0.002" polyethylene.

(2) 32 lb. resin coated kraft paper with 0.001" polyethylene film.

(3) Polymer coated cellophane film, 0.0005" polyethylene, 0.001" aluminum, and 0.002" polyethylene.

(4) Cellophane with lacquer coating and 0.002" polyethylene.

(5) 25 lb. kraft paper, 0.0015" polyethylene, 0.0005" aluminum foil, and 0.0015" polyethylene.

(6) 32 lb. super calendered (S.C.) special paper, 7 lb. polyethylene, 0.00035" aluminum foil, and 15 lb. polyethylene.

(7) 0.0005" aluminum foil, 1 lb. glue, 35 lb. super calendered (S.C.) special paper, and 30 lb. polyethylene.

The stability on storage is illustrated in the following table:

TABLE V.—THE ENZYME STABILITY OF THE RENNIN POWDER STORED AT ROOM TEMPERATURE

| Packaging material designation | Rennin activity retention after— | |
|---|---|---|
| | 1½ months storage | 4 months storage |
| 1 | 99 | 97 |
| 2 | 103 | 94 |
| 3 | 103 | 100 |
| 4 | 97 | 95 |
| 5 | 103 | 97 |

The novel rennin powder of the present invention has been tested in actual cheese production. Since the product is not totally soluble in water, it can either be added to the cheese vat as a suspension or a solution from which residual, insoluble and inactive proteins have been separated by filtration or sedimentation. Results of both techniques are shown below in Table VI.

TABLE VI.—THE MANUFACTURE OF CHEESE CURD USING POWDER RENNIN

| | Test | | | |
|---|---|---|---|---|
| | 1 | 2 | 3 | 4 |
| Gms. of rennin powder (25,000 rennin units/gm.) added per 1,000 lbs. of milk | 15 | 17½ | 18 | 20 |
| Treatment of the rennin solution prior to adding to milk | None | None | Filtered | Filtered |
| Time required (min.): | | | | |
| To clot milk | 16 | 13 | 13 | 12 |
| Until the curd is cut | 22 | 18 | 18 | 16 |
| Yield of cheese curd (percent wt. of raw milk) | 9.9 | 9.9 | 9.6 | 9.9 |
| Cheese curd analysis: | | | | |
| Moisture | 39 | 39 | 38 | |
| Fat | 30 | 30 | 32 | |
| Fat (on dry basis) | 48 | 48 | 50 | |

The milk being processed contained 3.1% butterfat. From this quality of milk one would normally expect, using regular commercial liquid rennin, 9.5±0.5% of cheese curd of analysis 35–38% moisture, and 48–50% fat, on a dry basis. It is obvious, therefore, that powder rennin is fully comparable to liquid rennin in cheese production performance. The usual clotting and cutting times, when using liquid rennin, are 12 and 16 minutes, respectively. Therefore, 20 grams of rennin powder (25,000 units/gm.) will be required per 1,000 lbs. of milk treated.

The following examples further illustrate the present process but are not intended to limit the scope of the invention in any way.

Example 1

(a) *Digestion.*—25 lbs. of fresh calf rennets are put through the 3/16" plate of a meat grinder. The ground rennets are placed in a kettle equipped with agitator and heating jacket. Water, equal in weight to twice the weight of the rennets and containing 250 mls. of 12 N HCl (10 mls. of 12 N HCl/lbs. rennets) are added to the kettle. Agitation is commenced and water at 43° C. is passed through the heating jacket. This is continued for about 1¼ hours. (Samples for assay are taken every ten minutes and activation is continued until maximum rennin activity is indicated, usually about 1¼ hours.) Activation is arrested by adjusting the pH to 5.7 with potassium bicarbonate. Agitation is continued for ¼ hour after pH adjustment. This digest is then dried immediately or if necessary, held in a cooler at 4° C. until the drying step.

(b) *Drying.*—25 gals. of xylene are added to a 50 gal. still. The still is placed under full vacuum and the agitator turned on. Heating is commenced by circulating 70–80° C. water through the heating jacket of the still. Approximately 25 pounds of the rennin digest are drawn into the still and the remaining 50 pounds is added over a period of 1 hour. Drying is continued until the temperature of the still contents has risen approximately 20° C. above its initial boiling point (about 3½ hours). After the drying is completed, the desiccated rennets are removed from the still and filtered in a perforated bowl centrifuge. They are washed with several gals. of fresh xylene and finally with 2 gals. of hexane. The dried, defatted rennets are dried overnight in an air dryer at 30–35° C.

(c) *Ethanol leaching.*—The dried, defatted rennets, if not already in powder form, are ground through a hammer mill. If the linings are in powder form, this step may be omitted. The powder rennin is agitated for 1 hour in 6 volumes of 95% ethanol. It is filtered immediately using filter paper on a stainless steel filter under vacuum. After filtration the ethanol is allowed to evaporate overnight in an air dryer at 30–35° C.

(d) *Emulsifier addition.*—After the ethanol has evaporated, the powdered rennin is ground again. The powder is spread on stainless steel trays and sprayed with Atmos 300 emulsifier at a 5% level. Atmos 300 is dissolved in 2 volumes of 95% ethanol and sprayed on with an atomizer. After being sprayed the powder is placed in a blender and blended for 2 hours. After blending the powder is returned to the trays and dried overnight in an air dryer at 30–35° C.

(e) *Standardizing of rennin strength.*—The dried rennin powder is assayed for rennin activity using the N.F. Reference Rennin sample as a standard. The powder is then diluted with salt to a standard strength of 25,000 rennin units per gram of powder. For practical use this powder is further blended with salt in a ratio of 1 part rennin powder to 1 part salt giving a product having 12,500 renning units per gram.

(f) *Packaging.*—The product is packaged in moisture and oxygen impermeable plastic film to provide packages of powder rennin of 40, 200 and 400 grams which will clot 1,000, 5,000 and 10,000 pounds of milk, respectively.

Example 2

(a) *Digestion.*—The digestion is performed as in "a" of the preceding example.

(b) *Drying.*—The digested mass is loaded into trays of a vacuum shelf dryer and dried in vacuo at 40–50° C. The dried material is solvent defatted by treatment with hexane. After removal of the fat, the product is dried in an air dryer at 30–35° C. and worked up according to steps (d, e and f) of the previous example.

Both drying methods, when combined with the novel steps of the present invention, provide a dried powdered rennin product in yields of 15 to 55% of rennin based on the weight of unsalted rennets. The procedure is characterized by its simplicity and freedom from contamination during processing due to the lack of large volumes of extract solutions heretofore encountered. Processing time is reduced from 1–2 weeks to 1 day. The product is stable at room temperature and is more easily stored and transported than the rennin presently marketed.

Example 3

The rennin powder produced in accordance with Example 1 was used in cheddar cheese production by addition of 39 grams of the powder, containing 12,500 I.U. of rennin per gram, per 1000 pounds of milk. The milk clotted in 14 minutes and the curds were ready for cutting after 24 minutes. Cheese production proceeded in the normal manner and the cheese was of excellent quality in both cases.

STERILIZATION

The rennin powder may be sterilized without affecting the rennin activity. Solutions of enzymes are easily sterilized by filtering out the bacteria and this is commonly practiced, but sterilization of enzyme powders is a difficult problem. The material cannot be heated to kill microorganisms since this would destroy the activity. Treatment with ethylene oxide has also been found to destroy enzyme activity. Addition of $H_2O_2$ both with and without propylene glycol to the digest before drying has no noticeable effect on bacterial loading. We have found that enzyme powders unexpectedly can be effectively sterilized by irradiation with retention of most of the enzyme activity. The sterilization step can be carried out before packaging but is very conveniently carried out on the packaged enzyme material. Gamma radiation from a suitable isotope such as $Co^{60}$ or irradiation from other known sources may be utilized. Radiation may be accomplished in Government-controlled facilities where otherwise unavailable.

In Table VII below are the results of reducing microorganisms by irradiating the enzyme material with gamma radiation from a $Co^{60}$ source.

TABLE VII.—THE EFFECT OF GAMMA RADIATION OF THE ENZYME ACTIVITY OF RENNIN AND THE CONTAINED MICROORGANISMS

| Radiation dosage (rads) | Percent enzyme activity retention | Spore counts | |
|---|---|---|---|
| | | Aerobic | Anaerobic |
| Control-0 | 100 | 15,900 | 12,720 |
| 500,000 | 94 | 2,622 | 1,657 |
| 1,000,000 | 91 | 156 | 56 |
| 1,500,000 | 88 | <8 | <5 |
| 2,000,000 | 84 | <5 | <5 |
| 2,500,000 | 81 | <5 | <5 |
| 5,000,000 | 70 | <5 | <5 |

It is apparent that a dosage of 1–2,000,000 rads is effective to destroy a substantial amount of microorganisms surprisingly with no serious loss of enzyme activity. In further work, it has been discovered that at $-70°$ C. the loss of activity on irradiation at $1.5 \times 10^6$ rads is only 5% as compared to 10% at room temperature. The irradiated product, in any event, is characterized by having aerobic and anaerobic spore counts of less than 1000.

We claim:
1. A process for obtaining dry powder rennin from animal stomach linings comprising activating the rennin enzyme of said linings with acid, adjusting the pH of the activated rennin-containing mass to the pH of maximum stability of the rennin enzyme, drying and defatting the pH adjusted material, and adding salt and an emulsifying agent to the dried and defatted rennin material to provide a dry, readily wettable product.

2. A process as claimed in claim 1 in which the pH adjusted material is vacuum dried and subsequently defatted with a fat solvent.

3. A process as claimed in claim 1 in which the pH adjusted material is simultaneously dried and defatted by azeotropic distillation with a fat solvent.

4. A process as claimed in claim 3 in which the solvent is xylene.

5. A process as claimed in claim 1 in which the dried rennin powder is sterilized by treatment with gamma radiation.

6. A process as claimed in claim 1 wherein the dried mixture is packaged in an air and moisture impervious package.

7. A process as claimed in claim 6 wherein the rennin material after packaging is sterilized by treatment of the package with gamma radiation.

8. A process as claimed in claim 1 in which the pH of the rennin-activated mass is adjusted with an alkali metal bicarbonate.

9. A process as claimed in claim 8 wherein the alkali metal bicarbonate is potassium bicarbonate.

10. A process for obtaining rennin from animal stomach linings comprising digesting said linings with HCl to activate the rennin enzyme of said linings, terminating the digestion by adjusting the pH to 5–6, simultaneously drying and defatting the activated linings by azeotropic distillation with xylene and recovering a dried rennin product.

11. A process as claimed in claim 10 in which the azeotropic distillation is conducted under a vacuum at a temperature in the range of between about 30 and 70° C.

12. A process as claimed in claim 11 wherein the major portion of the azeotropic distillation is conducted in the lower portion of the temperature range and distillation is stopped shortly after the complete dehydration is signified by a sharp increase in the boiling point of the mixture.

13. A process as claimed in claim 10 in which residual xylene in the recovered rennin product is removed by treating the dried product with ethanol.

14. A process for the preparation of a dry powder rennin comprising grinding unsalted calf rennets, digesting the ground rennets with HCl to activate the rennin enzyme, adjusting the pH of the resulting mass to about pH 5.7 by addition of an edible basic alkali metal salt, simultaneously drying and defatting the resulting material by azeotropic distillation with xylene, separating the dried and defatted rennin-containing material from residual xylene, mixing an emulsifying agent with the dried and defatted rennin material, adding salt to the resulting rennin material, and packaging the product in an air and moisture-impervious container.

15. The process of claim 14 wherein sufficient salt is incorporated in the rennin material to standardize the mixture at 25,000 I.U. rennin activity per gram and an additional quantity of salt is added to further substantially improve wettability of the product.

References Cited by the Examiner

UNITED STATES PATENTS

| | | | |
|---|---|---|---|
| 2,456,909 | 12/1948 | Brasch | 21—54 |
| 2,482,520 | 9/1949 | Scott et al. | 195—86 |
| 2,503,313 | 4/1950 | Levin | 195—65 |
| 2,807,551 | 9/1957 | Brasch et al. | 99—221 |
| 2,904,392 | 9/1959 | Pomerantz et al. | 21—54 |

A. LOUIS MONACELL, *Primary Examiner.*

L. M. SHAPIRO, *Assistant Examiner.*

UNITED STATES PATENT OFFICE
CERTIFICATE OF CORRECTION

Patent No. 3,281,332　　　　　　　　　　　　October 25, 1966

William O. Munns et al.

It is hereby certified that error appears in the above numbered patent requiring correction and that the said Letters Patent should read as corrected below.

Column 3, TABLE II, fourth column, line 1 thereof, insert -- 2.0 --; column 4, line 27, for "19.95%" read -- 19.5% --; columns 5 and 6, heading to the second column, for "Bath temp. ($^6$C.)" read -- Bath temp. (°C.) --.

Signed and sealed this 5th day of September 1967.

(SEAL)
Attest:

ERNEST W. SWIDER　　　　　　　　　　　　EDWARD J. BRENNER
Attesting Officer　　　　　　　　　　　　Commissioner of Patents